(12) United States Patent
Ju et al.

(10) Patent No.: US 6,304,887 B1
(45) Date of Patent: Oct. 16, 2001

(54) FFT-BASED PARALLEL SYSTEM FOR ARRAY PROCESSING WITH LOW LATENCY

(75) Inventors: Chwen-Jye Ju; Steven B. Sidman, both of Vancouver, WA (US)

(73) Assignees: Sharp Electronics Corporation, Mahwah, NJ (US); Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/151,939

(22) Filed: Sep. 11, 1998

Related U.S. Application Data

(60) Provisional application No. 60/058,592, filed on Sep. 12, 1997.

(51) Int. Cl.$^7$ .................................................. G06F 15/00
(52) U.S. Cl. .................................................. 708/404
(58) Field of Search ............................ 708/400, 403–404

(56) References Cited

U.S. PATENT DOCUMENTS

| Re. 34,734 | * | 9/1994 | Cambonie | 708/402 |
| 5,751,616 | | 5/1998 | Hegland et al. | 364/725.02 |

FOREIGN PATENT DOCUMENTS

0254628 A   1/1988   (EP) .

OTHER PUBLICATIONS

"Algorithm of Defining 1–D Indexing for M–D Mixed Radix FFT Implementation" by C. J. Ju, published in IEEE 1993, May, 1993, pp. 484–488.

"Equivalent Relationship and Unified Indexing of FFT Algorithms", by C. J. Ju, published in 1993 IEEE, May, 1993, pp. 742–745.

"A Chip Set for Pipeline and Parallel Pipeline FFT Architectures" by Szwarc and Desormeaux, Wong, Yeung, Chan and Kwasniewski, published in 8367 Journal of VLSI Signal Processing, December, 1994, pp. 253–265.

C. Ju, "Array processors for high–end array systems," DSP$^x$ Exposition 7 Symposium, San Jose, Oct. 1993, pp. 259–266.

C. Ju and M. Fleming, "Design concept of real–time array signal processors," Proceeding of International Conference on Signal Processing Applications and Technology, pp. 188–197, Boston, Nov. 1992.

C. Ju, "Equivalent relationship and unified indexing of FFT Algorithms," Proceedings of International Symposium on Circuits and Systems, pp. 742–745, Chicago, May 1993.

C. Ju, "What can block floating–point arithmetic do for DSP applications" Proceeding of International Conference on Signal Processing Applications and Technology, Santa Clar, 1993.

* cited by examiner

Primary Examiner—Tan V. Mai
(74) Attorney, Agent, or Firm—David C. Ripma; Matthew D. Rabdau; Scott C. Krieger

(57) ABSTRACT

A DSP system is provided for performing FFT computations with low latency by parallel processing of complex data points through a plurality of butterfly FFT execution units. The system simplifies the circuitry required by employing a single address generator for all of the memory units coupled to like ports on each execution unit. All RAM's connected to, for example, the A ports of a plurality of DSP's will be addressed by a single address generator. Similarly, all RAM's connected to the B ports of a plurality of DSP's will be addressed by a single address generator. Simple one-port RAM memory is suitable for use with the invention.

5 Claims, 2 Drawing Sheets

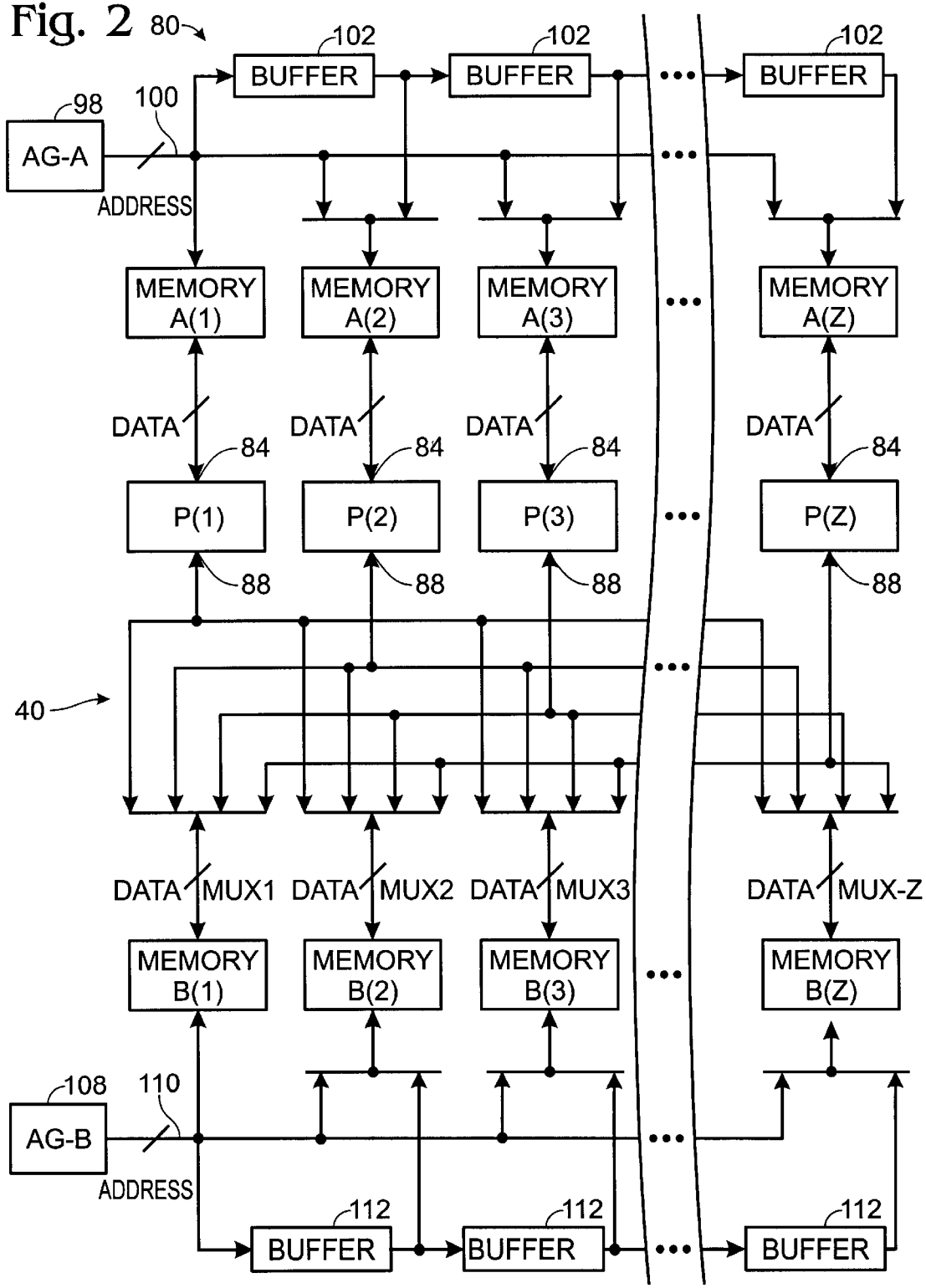

FFT-BASED PARALLEL SYSTEM FOR ARRAY PROCESSING WITH LOW LATENCY

This application claims the benefit of provisional application Ser. No. 60/058,592, filed Sep. 12, 1997, having the same title and inventors as the present application.

BACKGROUND AND SUMMARY OF THE INVENTION

This invention relates generally to data processing and more particularly to digital signal processing applications employing fast Fourier transforms (FFTs).

In general, digital signal processing (DSP) tasks are performed either in the time domain or in the frequency domain. Time domain refers to the situation where data are continuously sampled and, for subsequent digital processing, quantized. Frequency domain refers to the situation where the original time-ordered sequence of data is transformed into a set of spectra, with specific frequencies and amplitudes. These data are also usually quantized for further processing. For many DSP tasks, dealing with spectra in the frequency domain yields more insight and provides a more tractable way of solving problems than dealing with sequentially ordered data points in the time domain. The issue then becomes how to most efficiently transform time domain data into the frequency domain.

The most common algorithm used to do this transformation is called the Fast Fourier Transform, or FFT.

The FFT is obtained by starting with a more general form called the Discrete Fourier Transform, and then subdividing the calculations until one is left with an irreducible kernel operation, most commonly operating on two input data points only. This operation is called a butterfly operation because of the shape of the signal flow graph used to describe it. In the simplest butterfly operation ("radix-2"), the two input data points have their sum and difference multiplied by a coefficient, or "twiddle" factor. The sequence in the order of data for the two data points is then interchanged at the output. This interchange, or crossover gives rise to the term "butterfly" when the calculation is drawn as a signal flow graph.

Time domain data is transformed into the frequency domain by successively applying the butterfly operation to the entire time domain data set two data points at a time, and repeating this process multiple times, or "passes" using the partially transformed results of the prior pass of calculation. For Radix-2 calculation, the number of required passes of pairwise calculation (butterfly operations) through the data set is equal to the log base radix of the number of data points in the set. For Radix-2 butterfly calculation, the factor log base radix would be the log base 2. For a data set of 1024 points, the log base 2 of 1024 is $10(2^{10}=1024)$, so 10 passes through the data and its intermediately calculated results are required in order to calculate a 1024 point ("1K") FFT. Transforming 1024 time domain data points is then seen to require 10×512=5120 Radix-2 butterfly operations.

Other radices are possible, besides the most basic one of radix two. The physical interpretation is as follows. Radix-2 operates on two numbers at a time, Radix-4 is a higher order butterfly calculation that operates on four numbers at a time, Radix-16 is a still higher order butterfly calculation that operates on 16 numbers at a time, and so forth. The advantage of higher radix computation is that fewer passes through the data are required, because the pass-defining term (log base radix), is a smaller number. For example, a Radix-2 FFT of 256 points requires 8 passes through the data ($2^8=256$), while a Radix-16 evaluation of the FFT requires only two passes through the data ($16^2=256$). Therefore, if sufficient computational resource is present to permit evaluation of a Radix-16 butterfly in the equivalent time per clock per data point of a Radix-2 butterfly, the FFT calculation using the Radix-16 butterfly will be faster.

A general style of FFT calculation is called by-pass form. In this form of calculation, there is a fixed datapath that performs the butterfly calculation, but the data are supplied through external memory. The datapath performs a fixed set of calculations (the butterfly operation) on data that is presented to it. It is therefore necessary to properly sequence the data in these external memories for appropriate pass by pass FFT calculation by the datapath.

The Sharp® LH9124 FFT processor chip is an example of a bypass form processor that does FFTs. It has four data ports: Q, A, B, and C. Data are input into the Q or acquisition port. The results of the initial pass of butterfly calculation through the input data are output to port B. On the next pass of butterfly calculation, partially transformed data are read from the memory connected to Port B, processed, and output to the memory connected to Port A. Subsequent passes "ping-pong" the data between ports A and B. Port C is used to input coefficient data.

The time taken for any calculation may be described either as latency or as throughput. Latency is the time it takes from an initial condition until valid output data are obtained. Throughput is the time between subsequent data outputs, once a system is up and running.

There are three main ways of improving the FFT speed of bypass based systems.

1. Increase the order of the radix, thus decreasing the number of required passes through the data. This approach improves both latency and throughput, but is costly in terms of computational resource required for each processing element.

2. Cascade (pipeline) the datapath processors, such that each processor is responsible for the calculation of one pass of the FFT only, and calculates that pass repetitively on different blocks of data. Cascading improves throughput, but not latency. The very first FFT will still have to be processed by the appropriate number of passes, or cascaded stages. Every FFT after the first one will be output in 1N the time of the first, where N is the number of stages.

3. Parallel the datapath processors, such that a single large FFT is divided into N smaller FFTs. Each datapath processor is then dedicated to the calculation of an FFT that is 1/N the size of the original, although the number of passes appropriate for the original, larger data set is still required. Both latency and throughput are improved with this arrangement. Latency is improved because there are 1/N the number of original points on which any individual datapath processor has to operate. Throughput is improved for the same reason—there are fewer points for any individual datapath processor.

Note that cascading and parallel operation can be combined.

It would be advantageous if, in carrying out FFT computations, lower latency and improved throughput could be realized using parallel datapaths, in which all the addresses used in like data ports of each parallel datapath are supplied from one address sequencer, thus simplifying the system connections.

It would also be advantageous if such advantages could be obtained in a system which permitted use of ordinary single-port SRAM's in a parallel datapath connection.

Accordingly, the present invention is a system for use in digital signal processing applications for processing N data points through Y processing stages using Z execution units, where Z is a power of 2, each execution unit having a plurality of I/O ports including A and B ports. The system for processing the data further includes an addressable memory unit for each A and B port on each execution unit, including memory units A(1) through A(Z) operatively connected to the A ports of execution units P(1) through P(Z), respectively, and including memory units B(1) through B(Z) operatively connected to the B ports of execution units P(1) through P(Z), respectively. The data is processed through the Y processing stages by moving data in selected sequences through each execution unit P(q) between memory units A(q) and B(q), and in which at the start of the processing of the data the N data points are distributed between memory units connected to one of the ports of the execution units, either A(1) through A(Z) if distributed to the memory units connected to the A ports of the execution units or B(1) through B(Z) if distributed to the memory units connected to the B ports of the execution units, each memory unit receiving N/Z data points, and each execution unit P(1) through P(Z) processing a block of N/Z data points through the Y processing stages, the processing occurring in parallel.

The system for processing data comprises a first address generator AG-A operatively connected to memory units A(1) through A(Z) for supplying the address sequences used in the Y processing stages to memory units A(1) through A(Z), and a second address generator AG-B operatively connected to memory units B(1) through B(Z) for supplying the address sequences used in the Y processing stages to memory units B(1) through B(Z). Address generator AG-A supplies the same address sequence to all A(1) through A(Z) memory units, and address generator AG-B supplies the same address sequence to all B(1) through B(Z) memory units, whereby the N data points are processed in Z parallel streams through the Z execution units.

A more specific embodiment of the invention which carries out digital signal processing applications for processing 1024 data points through Y processing stages using 4 execution units P(1) through P(4) is also disclosed. Each of the execution units has a plurality of I/O ports including A and B ports. The system for processing the data further includes an addressable memory unit for each A and B port on each execution unit, including memory units A(1) through A(4) operatively connected to the A ports of execution units P(1) through P(4), respectively, and including memory units B(1) through B(4) operatively connected to the B ports of execution units P(1) through P(4), respectively. The data is processed through the Y processing stages by moving data in selected sequences through each execution unit P(q) between memory units A(q) and B(q), and in which at the start of the processing of the data the 1024 data points are distributed between memory units connected to one of the ports of the execution units, either A(1) through A(4) if distributed to the memory units connected to the A ports of the execution units or B(1) through B(4) if distributed to the memory units connected to the B ports of the execution units, each memory unit receiving 256 data points, and each execution unit P(1) through P(4) processing a block of 256 data points through the Y processing stages, the processing occurring in parallel.

The system further comprises a first address generator AG-A is operatively connected to memory units A(1) through A(4) for supplying the address sequences used in the Y processing stages to memory units A(1) through A(4), and a second address generator AG-B is operatively connected to memory units B(1) through B(4) for supplying the address sequences used in the Y processing stages to memory units B(1) through B(4). Address generator AG-A supplies the same address sequence to all A(1) through A(4) memory units, and address generator AG-B supplies the same address sequence to all B(1) through B(4) memory units, whereby the 1024 data points are processed in 4 parallel streams of 256 data points each through the 4 execution units.

The detailed description which follows also describes a system suitable for processing up to N data points through Y processing stages using 4 execution units.

BRIEF DESCRIPTION OF THE DRAWINGS

FIG. 2 is a partial schematic as in FIG. 1 showing the general application of the present invention to processing N points of complex data in Z parallel datapaths through Z-FFT execution units, each having at least A and B input/output ports, using a single address generator for supplying address sequences to the A ports of all the execution units, and a single address generator for supplying address sequences to the B ports of all the execution units.

DETAILED DESCRIPTION OF THE PREFERRED EMBODIMENTS

Figure 1:
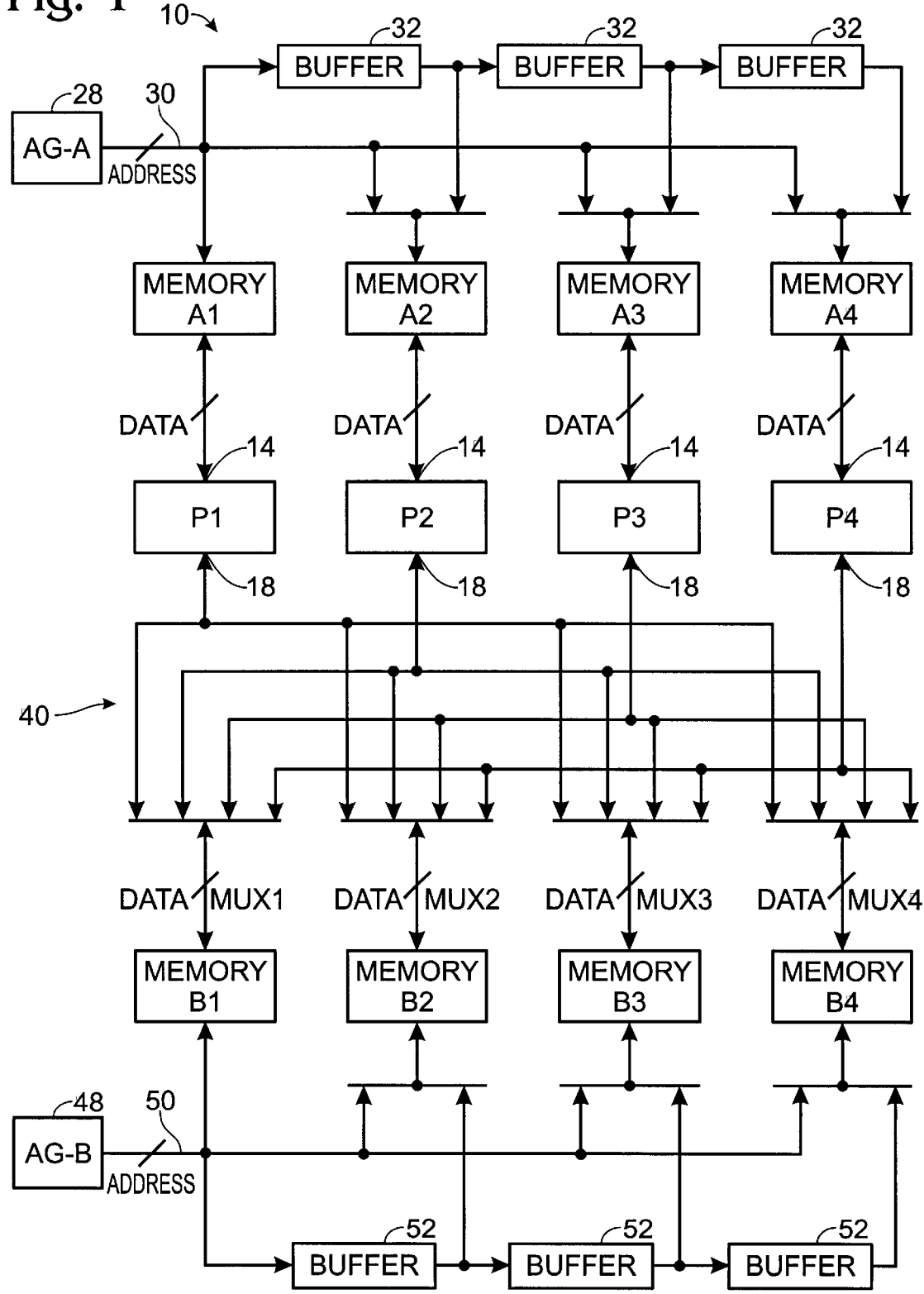
FIG. 1 is a partial schematic view of a digital signal processing system showing a parallel system with four FFT execution units (processors) for processing 1024 points of complex data in four parallel datapaths in accordance with the present invention.

Referring to FIG. 1, a digital signal processing system 10 is shown having four FFT execution units (processors) P1–P4. The execution units are preferably Sharp® LH9124 FFT processor chips, or similar DSP processors, capable of performing fast Fourier transform operations on complex data points. Execution units P1 through P4 are sometimes alternatively referred to herein as "processors" or "FFT's" or "data path processors" or "LH9124's" or "units." Each execution unit has four data ports: Q, A, B, and C, although for simplicity only the A port 14 and B port 18 of each unit are shown in FIG. 1. As will be understood by those skilled in the art, data are input into the Q or acquisition port (not shown) of the execution unit. The data passes through each execution unit and the results of the initial pass of the data through the unit, in which an FFT operation is performed is output to the A port 14 or B port 18 of the unit. The operation is sometimes referred to as a "butterfly" calculation because of the shape of the data flow path when drawn on a signal flow graph.

Assuming the data output from each execution unit is first sent to the A port, on the next pass of butterfly calculation through each execution unit, partially transformed data are read from the memory connected to Port A, the memory being shown in FIG. 1 as MEMORY boxes A1 through A4, processed, and output to the memory connected to Port B, which are shown as MEMORY boxes B1 through B4. Boxes A1–A4 and B1–B4 are suitable RAM memories. Subsequent passes of the data through execution units P1–P4 "ping-pong" the data between ports A and B of each unit 14, 18, respectively. Port C (not shown) of each execution unit is used to input coefficient data.

DSP 10, in the description which follows, processes 1024 data points in four parallel streams of 256 data points each through units P1–P4. It is assumed that the 1024 data points reside in memories A1–A4, having been entered into execution units though the Q ports (not shown) and output through each A port 14.

Addresses for memory locations in each memory box A1–A4 are supplied by the A port address generator 28 via line 30. Address generator ("AG") 28, also referred to as AG-A, is preferably a Sharp® LH9320 address generator, also called a memory management unit. Buffers 32 control the interleave of the data sequences and are used whenever it is necessary to offset the addresses by one or more clock cycles in order to synchronize the parallel FFT operations.

Multiplexers 40, which respectively couple execution units P1–P4 to B port memories B1–B4 (the multiplexers are referenced in FIG. 1 as MUX1 though MUX4), are employed at the end of the butterfly calculations to sort the data points into the proper output sequence.

After the first butterfly calculation, described in detail below, the data are read from memories A1–A4, are processed through execution units P1–P4, respectively, and stored in memories B1–B4, respectively.

Addresses for memory locations in each memory box B1–B4 are supplied by the B port address generator 48 via line 50. AG-B 50 is preferably the same type as AG-A 28. Buffers 52 are used in the same manner as buffers 32 in line 30.

What follows are examples of how parallel DSP operations are carried out in accordance with the present invention using the processor configuration shown in FIG. 1. In the examples, each address generator can be used to supply addresses to four memories, each of which is connected to a port, for example the A or the B port, on one of the four parallel execution units P1–P4. The example processes 1024 data points using four execution units (P1–P4) to carry out up to five stages of operations in four parallel paths, each execution unit handling 256 data points.

What follows an example using one FFT processor only in order to demonstrate the difference between single and parallel computations. In this example a description is provided of how a single (prior art) FFT processor would process 1K-data points (actually, 1024 data points) through a single data path. That will illustrate how the data sequences evolve in the memory units connected to the A and B ports of an execution unit. Assuming a single FFT, like unit P1 in FIG. 1 is connected via its A port to a single 1024-storage location RAM A1, and via its B port to a similar RAM B1, the evolution of data sequences in the memories is set forth below. Each "Stage" (equivalent to a "pass") represents the results of a butterfly computation carried out by the execution unit, with the data being stored alternately in A and B RAMs: Following the description of the data sequences for a single processing datapath, the data sequences for parallel processing will be provided.

At the start, the data are stored sequentially in the RAM as follows:

Stage 0: 0, 1, 2, 3, . . . , 1021, 1022, 1023

After the first pass through the FFT the data, in the RAM on the opposite port of the execution unit, are in the following sequence:

---

Stage 3: 0, 64, 128, 192, ... , 832, 896, 960
1, 65, 129, 193, ... , 833, 897, 961
2, 66, 130, 194, ... , 834, 898, 962
...
62; 126, 190, 254, ... , 894, 958, 1022
63, 127, 191, 255, ... , 895, 959, 1023

---

After the next pass:

---

Stage 1: 0, 4, 8, 12, ... , 1012, 1016, 1020
1, 5, 9, 13, ... , 1013, 1017, 1021
2, 6, 10, 14, ... , 1014, 1018, 1022
3, 7, 11, 15, ... , 1015, 1019, 1023

---

Next pass:

---

Stage 2: 0, 16, 32, 48, ... , 976, 992, 1008
1, 17, 33, 49, ... , 977, 993, 1009
2, 18, 34, 50, ... , 978, 994, 1010
...
14, 30, 46, 62, ... , 990, 1006, 1022
15, 31, 47, 63, ... , 991, 1007, 1023

---

Next pass and final data configuration:

---

Stage 4: 0, 256, 512, 768
1, 257, 513, 769
2, 258, 514, 770
...
254, 510, 766, 1022
255, 511, 767, 1023

---

For parallel system implementation, as in the preferred embodiment of the present invention, wherein four execution units (P1–P4 in FIG. 1) process the complex data which are initially stored in the memory banks in the locations from 0 to 255. The 1024 data points are initially distributed to either the memory banks (Banks 1–4) (also called addressable memory units) A1–A4 connected respectively to the A ports of P1–P4, or to the memory banks B1–B4 connected respectively to the B ports of P1–P4. For the discussion which follows the generic term "banks" will be used for A port memories A(1)–A(4) and the B port memories B(1) through B(4).

As first loaded in RAM (Banks 1–4) the data are distributed as follows:

Bank 1: 0, 1, 2, 3, . . . , 253, 254, 255
Bank 2: 256, 257, 258, 259, . . . , 509, 510, 511
Bank 3: 512, 513, 514, 515, . . . , 765, 766, 767
Bank 4: 768, 769, 770, 771, . . . , 1021, 1022, 1023

Thus, the-i-th location in bank 1 will be the i-th data, in bank 2 will be (i+256)-th data, in bank 3 will be (i+512)-th data, and in bank 4 will be (i+768)-th data.

Each bank has to provide one complex datum for each of the radix-4 butterfly module computations carried out in execution units P1–P4. For the first module computations with data 0, 256, 512, and 768, the data must come from the first location of each bank. Since each execution unit only receives one data point in each clock cycle, the data will come in to the execution units in parallel sequences, the address locations for the data supplied comes from the address generator, which supplies addresses to all the memories connected to the respective port (A or B). In other words, address generator (AG-A) 28 (FIG. 1), which can be called a first address generator and which is operatively connected to memory units A(1) through A(4), supplies the address sequences used in all the processing stages carried out by execution units P(1) through P(4), respectively. Similarly, address generator (AG-B) 48, which can be called a second address generator and which is operatively connected to memory units B(1) through B(4), supplies the address sequences used in all the processing stages carried out by execution units P(1) through P(4), respectively.

The architecture shown in FIG. 1 implement the memory bank interleave, meaning the distribution of the data points between and within the four memory banks on each side (A or B) of each execution unit (P1–P4). Note that ordinary single-port SRAM's are used for memories A(1)–A(4) and B(1)–B(4). It can be seen that only one address generator is required because the data for each module computations are from the same location in each bank.

What follows is a detailed explanation of a 1024 point FFT implementation by a single execution unit. The radix-4 butterfly instruction to implement the 1K-point FFT. Thus, as will be understood by those skilled in the art of butterfly FFT computations, there will be 5 passes of radix-4 butterfly calculations. Units P1–P4 can be seen as a radix-4 butterfly execution engine. Each radix-4 butterfly computation needs 4 data points, one for each parallel datapath. Therefore, there will be 256 (1024/4) radix-4 butterfly computations for each pass. The engine will perform the radix-4 butterfly operations without interruption until the last data of that pass. The data flow instruction is to define the input and output ports for each pass.

Assuming the data are stored in the B port in the sequence as b(0), b(1), b(2), b(3), . . . , b(1021), b(1022), b(1023)

Stage 0, the following will apply:

The input port is: B

The output port is: A

Data Flow Instruction will be: RBWA (read B; write A)

Execution Instruction for a Sharp® LH9124: BFLY4

B Port Address Generator (AG-B) Addressing Instruction: BF40 (Assumed data in digital-reverse sequence)

A Port AG-A Addressing Instruction: BF40 (Input and Output can use the same addressing instruction because in-place FFT algorithm is employed)

The addressing sequence will be
0, 1, 2, 3, 4, 5, . . . , 1019, 1020, 1021, 1022, 1023

The 1st radix-4 butterfly execution will use the first four input data 0, 1, 2, 3, the 2nd butterfly will use the following four data 4, 5, 6, 7, and so on. We can collect the output results after 18 cycles from the first input data entering the LH9124. Note that 18 cycles refers to 18 clock cycles, which is the pipeline delay of a Sharp® LH9124 execution unit performing radix butterfly calculations. It is used herein as an example. The first 4 output data will be the execution result of the 1st radix-4 butterfly and the following 4 data will be the execution result of the 2nd radix-4 butterfly. The output data will be stored in the A-port memory with an address sequence as 0, 1, 2, 3, 4, . . . ,. 1021, 1022, 1023

Stage 1:

Input Port: A (The input port will be the output port of previous stage or pass of calculation)

Output Port: B

Data Flow Instruction: RAWB (read A; write B)

LH9124 Execution Instruction: BFLY4

A Port LH9320 Addressing Instruction: BF41

B Port LH9320 Addressing Instruction: BF41 (Input and Output can use the same addressing instruction because in-place FFT algorithm is employed)

The addressing sequence will be 0, 4, 8, 12, ... , 1012, 1016, 1020
1, 5, 9, 13, ... , 1013, 1017, 1021
2, 6, 10, 14, ... , 1014, 1018, 1022
3, 7, 11, 15, ... , 1015, 1019, 1023

The 1st radix-4 butterfly execution will use the first four input data at the memory addresses 0, 4, 8, and 12, the 2nd butterfly will use the following four data at memory addresses 16, 20, 24, and 28, and so on. We can collect the output results after 18 cycles from the first input data entering the LH9124. The first 4 output data will be the execution result of the 1st radix-4 butterfly and the following 4 data will be the execution result of the 2nd radix-4 butterfly. The output data will be stored in the B-port memory with the address sequence as the input address sequence.

Stage 2:

Input Port: B (The input port will be the output port of previous stage)

Output Port: A

Data Flow Instruction: RBWA

LH9124 Execution Instruction: BFLY4

A Port LH9320 Addressing Instruction: BF42

B Port LH9320 Addressing Instruction: BF42 (Input and Output can-use the same addressing instruction because in-place FFT algorithm is employed)

The addressing sequence will be 0, 16, 32, 48, ... , 976, 992, 1008
1, 17, 33, 49, ... , 977, 993, 1009
...
14, 30, 46, 62, ... , 990, 1006, 1022
15, 31, 47, 63, ... , 991, 1007, 1023

The 1st radix-4 butterfly execution will use the first four input data at the memory addresses 0, 16, 32, and 48, the 2nd butterfly will use the following four data at memory addresses 64, 80, 96, and 112, and so on. We can collect the output results after 18 cycles from the first input data entering the LH9124. The first 4 output data will be the execution result of the 1st radix-4 butterfly and the following 4 data will be the execution result of the 2nd radix-4 butterfly. The output data will be stored in the A-port memory with the address sequence as the input address sequence.

Stage 3:

Input Port: A (The input port will be the output port of previous stage)

Output Port: B

Data Flow Instruction: RAWB

LH9124 Execution Instruction: BFLY4

A Port LH9320 Addressing Instruction: BF43

B Port LH9320 Addressing Instruction: BF43 (Input and Output can use the same addressing instruction because in-place FFT algorithm is employed)

The addressing sequence will be

```
0, 64, 128, 192, ... , 832, 896, 960
1, 65, 129, 193, ... , 833, 897, 961
...
62, 126, 190, 254, ... , 894, 958, 1022
63, 127, 191, 255, ... , 895, 959, 1023
```

The 1st radix-4 butterfly execution will use the first four input data at the memory addresses 0, 64, 128, and 192, the 2nd butterfly will use the following four data at memory addresses 256, 320, 384, and 448, and so on. We can collect the output results after 18 cycles from the first input data entering the LH9124. The first 4 output data will be the execution result of the 1st radix-4 butterfly and the following 4 data will be the execution result of the 2nd radix-4 butterfly. The output data will be stored in the B-port memory with the address sequence as the input address sequence.

Stage 4:

Input Port: B (The input port will be the output port of previous stage)
Output Port: A
Data Flow Instruction: RBWA
LH9124 Execution Instruction: BFLY4
A Port LH9320 Addressing Instruction: BF44
B Port LH9320 Addressing Instruction: BF44 (Input and Output can use the same addressing instruction because in-place FFT algorithm is employed)

The addressing sequence will be

```
0, 256, 512, 768
1, 257, 513, 769
...
254, 510, 766, 1022
255, 511, 767, 1023
```

The 1st radix-4 butterfly execution will use the first four input data at the memory addresses 0, 64, 128, and 192, the 2nd butterfly will use the following four data at memory addresses 256, 320, 384, and 448, and so on. We can collect the output results after 18 cycles from the first input data entering the LH9124. The first 4 output data will be the execution result of the 1st radix-4 butterfly and the following 4 data will be the execution result of the 2nd radix-4 butterfly. The output data will be stored in the A-port memory with the address sequence as the input address sequence.

What follows is a detailed explanation of a 1024-point FFT implementation by four parallel execution units P1–P4 as shown in FIG. 1. The data are stored in the B port of 4 LH9124 processor as follows:

Memory Bank 1 at the B port of processor 1: b(0), b(1), b(2), b(3), b(4), . . . b(253), b(254), b(255)
Memory Bank 2 at the B port of processor 2: b(256), b(257), b(258), b(259), b(260), . . . , b(509), b(510), b(511)
Memory Bank 3 at the B port of processor 3: b(512), b(513), b(514), b(515), b(516), . . . , b(765), b(766), b(767)
Memory Bank 4 at the B port of processor 4: b(768), b(769), b(770), b(771), b(772), . . . , b(1021), b(1022), b(1023)

We will choose the radix-4 butterfly instruction to implement 1K-point parallel FFT. We also need 5 radix-4 butterfly stages. However, in each stage, each LH9124 will computes 256 data instead of 1024 data.

The computation for each stage is shown as follows:

Stage 0:

Input Port: B
output Port: A
Data Flow Instruction: RBWA
LH9124 Execution Instruction: BFLY4
A Port LH9320 Addressing Instruction: BF40
B Port LH9320 Addressing Instruction: BF40

The addressing sequence for each bank will be 0, 1, 2, 3, 4, 5, . . . , 251, 252, 253, 254, 255

For datapath processor 1, the 1st four input data will be 0, 1, 2, 3 and the 2nd four input data, will be 4, 5, 6, 7, and so on.

For datapath processor 2, the 1st four input data will be 256, 257, 258, 259, and the 2nd four input data will be 260, 261, 262, 263, and so on.

For datapath processor 3, the 1st four input data will be 512, 513, 514, 515, and the 2nd four input data will be 516, 517, 518, 519, and so on. For datapath processor 4, the 1st four input data will be 768, 769, 770, 771, and the 2nd four input data will be 772, 773, 774, 775, and so on.

After 18 cycles, we begin to get the output results from the A port. The results will be stored in the A port memory with the same address sequence as the input port.

Stage 1:

Input Port: A
output Port: B
Data Flow Instruction: RAWB
LH9124 Execution Instruction: BFLY4
A Port LH9320 Addressing Instruction: BF41
B Port LH9320 Addressing Instruction: BF41

The addressing sequence for each bank will be

```
0, 4, 8, 12, ... , 244, 248, 252
1, 5, 9, 13, ... , 245, 249, 253
2, 6, 10, 14, ... , 246, 250, 254
3, 7, 11, 15, ... , 247, 251, 255
```

For datapath processor 1, the 1st four input data will be 0, 4, 8, 12 and the 2nd four input data, will be 16, 20, 24, 28, and so on.

For datapath processor 2, the 1st four input data will be 256, 260, 264, 268, and the 2nd four input data will be 272, 276, 280, 284, and so on.

For datapath processor 3, the 1st four input data will be 512, 516, 520, 524, and the 2nd four input data will be 528, 532, 536, 540, and so on.

For datapath processor 3, the 1st four input data will be 768, 772, 776, 780, and the 2nd four input data will be 784, 788, 792, 796, and so on.

After 18 cycles, we begin to get the output results from the B port. The results will be stored in the B port memory with the same address sequence as the input port.

Stage 2:

Input Port: B
Output Port: A
Data flow Instruction: RBWA
LH9124 Execution Instruction: BFLY4
A Port LH9320 Addressing Instruction: BF42
B Port LH9320 Addressing Instruction: BF42

The addressing sequence for each bank will be

| |
|---|
| 0, 16, 32, 48, ... , 208, 224, 240 |
| 1, 17, 33, 49, ... , 209, 225, 241 |
| ... |
| 14, 30, 46, 62, ... , 222, 238, 254 |
| 15, 31, 47, 63, ... , 223, 239, 255 |

For datapath processor 1, the 1st four input data will be 0, 16, 32, 48 and the 2nd four input data, will be 64, 80, 96, 112, and so on.

For datapath processor 2, the 1st four input data will be 256, 272, 288, 304, and the 2nd four input data will be 320, 336, 352, 368, and so on.

For datapath processor 3, the 1st four input data will be 512, 528, 544, 560, and the 2nd four input data will be 576, 592, 608, 624, and so on.

For datapath processor 3, the 1st four input data will be 768, 784, 800, 816, and the 2nd four input data will be 832, 848, 864, 880, and so on.

After 18 clock cycles, we begin to get the output results from the A port. The results will be stored in the A port memory with the same address sequence as the input port.

Stage 3:
   Input Port: A
   output Port: B
   Data Flow Instruction: RAWB (Read A Write B)
   LH9124 Execution Instruction: BFLY4
   A Port LH9320 Addressing Instruction: BF43
   B Port LH9320 Addressing Instruction: BF43
   The addressing sequence for each bank will be

| |
|---|
| 0, 64, 128, 192, |
| 1, 65, 129, 193, |
| ... |
| 62, 126, 190, 254, |
| 63, 127, 191, 255 |

For datapath processor 1, the 1st four input data will be 0, 64, 128, 192 and the 2nd four input data, will be 1, 65, 129, 193, and so on.

For datapath processor 2, the 1st four input data will be 256, 320, 384, 448, and the 2nd four input data will be 257, 321, 384, 448, and so on.

For datapath processor 3, the 1st four input data will be 512, 576, 640, 704, and the 2nd four input data will be 513, 577, 641, 705, and so on.

For datapath processor 3, the 1st four input data will be 768, 832, 896, 960, and the 2nd four input data will be 769, 833, 897, 961, and so on.

After 18 cycles, we begin to get the output results from the B port. The results will be stored in the B port memory with the same address sequence as the input port.

Stage 4:
   Input Port: B
   output Port: A
   Data Flow Instruction: RBWA
   LH9124 Execution Instruction: BFLY4
   B Port LH9320 Addressing Instruction: BF40
   A Port LH9320 Addressing Instruction: BF43
Only this stage uses the delay buffers and switching circuits. (In the paper, we use the delay buffers and switching circuits in the first stage. The result is the same. Here, the order is reversed because it might be easier to explain and understand the approach.)

The input addressing sequence will be: 0, 1, 2, 3, 4, 5, ... , 252, 253, 254, 255

The datapath processor 1 will use the sequence 0, 4, 8, 12, ... , 244, 248, 252

Thus, the 1st radix-4 butterfly will get the four data from address 0 of all the four banks and the 2nd radix-4 butterfly will get the four data from address 4 of all the four banks, and so on.

The datapath processor 2 will use the sequence 1, 5, 9, 13, ... , 245, 249, 253

Thus, the 1st radix-4 butterfly will get the four data from address 1 of all the four banks and the 2nd radix-4 butterfly will get the four data from address 5 of all the four banks, and so on.

The datapath processor 3 will use the sequence 2, 6, 10, 14, ... , 246, 250, 254

Thus, the 1st radix-4 butterfly will get the four data from address 2 of all the four banks and the 2nd radix-4 butterfly will get the four data from address 6 of all the four banks, and so on.

The datapath processor 4 will use the sequence 3, 7, 11, 15, ... , 247, 251, 255

Thus, the 1st radix-4 butterfly will get the four data from address 3 of all the four banks and the 2nd radix-4 butterfly will get the four data from address 7 of all the four banks, and so on.

The output sequence will be different from the input sequence. Each output port use the same BF43 instruction with time interleave.

The output sequence for each port will be: 0, 64, 128, 192, 1, 65, 129, 193, ... , 63, 127, 191, 255

The address for Processor i is one cycle ahead of that for processor i+1. Thus, the final data will be stored in A port.

The output results stored in the Bank 1 of A port will be: X(0), X(4), X(8), X(12), ... , X(1016), X(1020)

The output results stored in the Bank 2 of A port will be: X(1), X(5), X(9), X(13), ... , X(1017), X(1021)

The output results stored in the Bank 3 of A port will be: X(2), X(6), X(10), X(14), ... , X(1018), X(1022)

The output results stored in the Bank 4 of A port will be: X(3), X(7), X(11), X(15), ... , X(1019), X(1023)

To complete the computations it is necessary to interleave the data through multiplexers MUX1–MUX4 to sort the data points into the proper output sequence, as will be understood by those skilled in the art. In that way the data will be in the desired order in their final memory locations within the selected memory banks (A1–A4 or B1–B1 ).

The present invention can be employed in FFT computations carried out in more or fewer than 4 parallel datapaths. FIG. 2 shows an example of a system for processing data in DSP applications for processing N data points through Y processing stages using Z execution units P(1) through P(Z), where Z is a power of 2. DSP system 80 has the same elements as system 10 in FIG. 1, in greater or lesser numbers of individual elements depending on whether Z is greater or lesser than 4. A similarity between systems 10 and 80 is that each only includes a single address generator for supplying all the addresses to all the memory units operatively connected to either the A ports or B ports of the execution units P(1) through P(Z). In FIG. 2, like in FIG. 1, each execution unit includes an A and a B port, with an addressable memory unit operatively connected to each port. Preferably the A port memory units A(1) through A(Z) and the B port memory units B(1) through B(Z) are single-port RAMs.

Execution units P(1) through P(Z) are the same as P1 through P4 in FIG. 1. Each execution unit has four data ports: Q, A, B, and C, although for simplicity only the A port 84 and B port 88 of each unit are shown in FIG. 2. As will be understood by those skilled in the art, data are input into the Q or acquisition port (not shown) of the execution unit. The data passes through each execution unit and the results of the initial pass of the data through the unit, in which an FFT operation is performed is output to the A port 84 or B port 88 of the unit.

The N points of complex data are first distributed between memory units connected to one of the ports of the execution units, either A(1) through A(Z) if distributed to the memory units connected to the A ports of the execution units or, if to the B ports, to memory units B(1) through B(Z). Each memory unit will receive N/Z data points. In the general example of FIG. 2, both N and Z can be any suitable number. If latency is to be minimized, a larger number of parallel datapaths Z will be provided and the size of each memory unit A(1)–A(Z) and B(1)–B(Z) can be correspondingly smaller. If a larger number of data points are to be processed through fewer parallel datapaths, the amount of data distributed to each memory unit will be comparatively larger. Either way, N/Z data points will be distributed to each memory unit and each execution unit P(1) through P(Z) will process a block of N/Z data points through Y processing stages, Y being a function of the butterfly calculations performed.

To give an example similar to the example given above with reference to FIG. 1, assume that N is larger than 1024 by some multiple of 256 and that memory units A(1)–A(Z) and B(1)–B(Z) each have 256 storage locations. The number of parallel datapaths is Z, including Z execution units P(1)–P(Z), and the number of "Banks" (as defined in the first example with 4 Banks) first loaded with data will be Z. N/Z will equal 256, which is the number of data points loaded into each of the initially-loaded memory units (either A(1)–A(Z) or B(1)–B(Z)).

As first loaded in RAM (Banks 1–Z) the data are distributed as follows:

Bank 1: 0, 1, 2, 3, ... , 253, 254, 255
Bank 2: 256, 257, 258, 259, ... , 509, 510, 511
Bank 3: 512, 513, 514, 515, ... , 765, 766, 767
Bank 4: 768, 769, 770, 771, ... , 1021, 1022, 1023
...
...
Bank Z: N-256; N-255; N-254; N-253;. . . . ; N-2; N-1; N Thus, the i-th location in bank 1 will be the i-th data, in bank 2 will be (i+256)-th data, in bank 3 will be (i+512)-th data, in bank 4 will be (i+768)-th data, and in bank Z will be [i+(N−1)×256]-th data.

Each bank has to provide one complex datum for each of the radix butterfly module computations carried out in execution units P(1)–P(Z). For the first module computations with data 0, 256, 512, 768,. (N−256), the data must come from the first location of each bank. Since each execution unit only receives one data point in each clock cycle, the data will come in to the execution units in parallel sequences, the address locations for the data supplied comes from the address generator, which supplies addresses to all the memories connected to the respective port (A or B). In other words, address generator (AG-A) 98 (FIG. 2), which can be called a first address generator and which is operatively connected to memory units A(1) through A(Z), supplies the address sequences used in all the processing stages carried out by execution units P(1) through P(Z), respectively. Similarly, address generator (AG-B) 108, which can be called a second address generator and which is operatively connected to memory units B(1) through B(Z), supplies the address sequences used in all the processing stages carried out by execution units P(1) through P(Z), respectively.

AG-A 98 supplies addresses to memory units A(1) through A(Z) via line 100. Buffers 102 control the interleave of the data sequences and are used whenever it is necessary to offset the addresses by one or more clock cycles in order to synchronize the parallel FFT operations. Similarly, AG-B 108 supplies addresses to memory units B(1) through B(Z) via line 110. Buffers 112 control the interleave of the data sequences and are used whenever it is necessary to offset the addresses by one or more clock cycles in order to synchronize the parallel FFT operations.

To complete the computations it is necessary to interleave the data through multiplexers MUX1 through MUX-Z to sort the data points into the proper output sequence, as will be understood by those skilled in the art. In that way the data will be in the desired order in their final memory locations within the selected memory banks [A(1)–A(Z) or B(1)–B(Z)].

The present invention provides a DSP system for carrying out FFT computations in parallel with lower latency and improved throughput using a single address sequencer (AG-A or AG-B) to supply all the addresses used in like data ports (A or B) of each parallel datapath. It also permits the use of ordinary single-port SRAM's in a parallel datapath connection.

What follows is a general description of the derivation of FFT's and their use in butterfly computations.

The Discrete Fourier Transform (DFT) of an N-point sequence {x(n)} is defined by $$X(k) = \sum_{n=0}^{N-1} x(n) W_N^{nk} \text{ for } 0 \leq k < N-1 \qquad (1)$$

where $W_N^j = W^{-\pi j/N}$. Thus, the vector-matrix form of an DFT can be expressed as $$\underline{X} = TW_N * \underline{x} \qquad (2)$$

where $\underline{X}$ and $\underline{x}$ are N-point vectors and $TW_N$ is an N by N twiddle factor matrix. The twiddle factor matrix itself cannot be recursively decomposed. Actually, the bit-reverse matrix or digit-reverse matrix plays the central role in the DFT to FFT decomposition.

The bit-reverse input and linear output (BI/LO) FFT algorithm can be obtained by factorizing the twiddle factor matrix post-multiplied by an N by N bit-reverse matrix $P_{br}$ as $$T_N = TW_N * P_{br} \qquad (3)$$

The matrix $T_N$ can be factorized by the following recursive equation:

$$T_N = \begin{bmatrix} I_{N/2} & A_{N/2} \\ I_{N/2} & -A_{N/2} \end{bmatrix} \begin{bmatrix} T_{N/2} & 0_{N/2} \\ 0_{N/2} & T_{N/2} \end{bmatrix} \qquad (4)$$

-continued $$= \begin{bmatrix} I_{N/2} & A_{N/2} \\ I_{N/2} & -A_{N/2} \end{bmatrix} \begin{bmatrix} I_{N/4} & A_{N/4} & 0_{N/4} & 0_{N/4} \\ I_{N/4} & -A_{N/4} & 0_{N/4} & 0_{N/4} \\ 0_{N/4} & 0_{N/4} & I_{N/4} & A_{N/4} \\ 0_{N/4} & 0_{N/4} & I_{N/4} & -A_{N/4} \end{bmatrix}$$

$$\begin{bmatrix} T_{N/4} & 0_{N/4} & 0_{N/4} & 0_{N/4} \\ 0_{N/4} & T_{N/4} & 0_{N/4} & 0_{N/4} \\ 0_{N/4} & 0_{N/4} & T_{N/4} & 0_{N/4} \\ 0_{N/4} & 0_{N/4} & 0_{N/4} & T_{N/4} \end{bmatrix}$$

where $I_N, A_N, T_N$, and 0 are N by N matrices. $I_N$ is an identity matrix and $0_N$ is a zero matrix. The matrix $A_N/2$ is a diagonal matrix with $$A_{N/2} = \text{diag}(W_N^0 W_N^1 \ldots W_{N/2-1}^N) \quad (5)$$

The elements of $T_N$ and $T_{N/2}$ have the following relation.

$$T_{N/2}(i,j) = T_N(i,j) \text{ for } 0 \leq i,j < N/2 - 1 \quad (6)$$

This section will show that the twiddle factor matrix factorization (4) for BI/LO FFT can be further partitioned. Thus, each butterfly stage can be represented by the input connection matrix followed by the butterfly computation matrix and the output interconnection matrix. Some essential physical meaning in FFT algorithm implementation can be found through the three-matrix representation of the butterfly stage.

Inserting the recursive factorization equation (4) into (2) and setting the data length $N=2^s$, we can represent the DFT by cascaded butterfly stage matrices as follows:

$$\underline{X} = FG_s(BI(s)) * FG_{s-1}(BI(s-1)) \quad (7)$$

$$* \ldots * FG_1(BI(1)) * P_{br} * \underline{x}$$

where $\underline{X}$ and $\underline{x}$, respectively, denote the N-point linear vector and N-point linear input vector. $FG_k(BS(k))$ notes the k-th stage of the FFT algorithm.

Each stage of the FFT can be further partitioned into three matrices: the right permutation matrix indicating the input interconnection, the matrix indicating the butterfly operation, and the left matrix indicating the output interconnection as follows.

$$FG_k(BI(k)) = P_{lk} * BI(k) * P_{rk} \quad (8)$$

$P_{rk}$ specifies the interconnection between inputs and butterfly modules and is a permutation matrix. $P_{lk}$ specifies the interconnection between butterfly modules and outputs and is also a permutation matrix. If the in-place algorithm is employed, the left permutation matrix $P_{lk}$ is the transpose of the right permutation matrix $P_{rk}$. $BI(k)$ is the k-th stage butterfly operation matrix and it is a block diagonal matrix.

Signal flow Graph (SFG) is usually used to represent the FFT algorithms. In, we showed that the multi-dimensional (M-D) FFT can be mapped into 1-D SFG. All the M-D FFT algorithms can also be represented by vector-matrix form. It is derived that all the FFT algorithms with the same number of data regardless of dimensions can have the same permutation matrices. This means they share the same SFG structure. In addition, the butterfly permutation (interconnection) matrices for the k-th stage of 1-D to M-D FFTs are the same. These results imply that the addressing for the 1-D FFT can be employed to that for the M-D FFT. The only difference between 1-D and M-D FFT is the twiddle factor coefficients in SFG.

Given a 2-D array with $N_1 \times N_2 = N$, in the row-column approach, we may compute $N_2$ 1-D row FFT (rfft) and $N_1$ 1-D column FFT (cfft). It can be derived that the $N_2$ rffts can be implemented by the first $s_1$ stages of the N-point 1-D FFT and the $N_1$ cffts by the first $s_2$ stages of the N-point 1-D FFT, where $N_1 = 2^{s_1}$ and $N_2 = 2^{s_2}$. If the rffts and cffts are implemented by (7) and the transpose matrix was combined with the cffts, we can get the vector-matrix form for 2-D FFT as follows:

$$\underline{X}_r^T = FG_{s1+s2}(BI(s_2)) * FG_{s1+s2-1}(BI(s_2-1)) * \ldots * \quad (9)$$

$$FG_{s1+1}(BI(1)) * FG_{s1}(BI(s_1))$$

$$* \ldots * FG_1(BI(1)) * \underline{x}_{br}^T$$

where $\underline{X}_r^T$ is an N-point vector in the row-major order of the linear output array and $\underline{x}_{br}^T$ is an N-point vector in the row-major order of the bit-reverse input array. Comparing (9) with (7), the $N_1$ by $N_2$ 2-D FFT has the same interconnection structure as the N-point 1-D FFT. Moreover, the butterfly operation matrices are the same for the k-th stage of the row FFT, column FFT, and 1-D FFT.

In practical implementation, the unified vector-matrix representation for 1-D to M-D FFT implies that the 1-D addressing sequences, including data, twiddle factor, and bit-reverse, can be employed to all the FFTs regardless of its dimension. Therefore, the parallel FFT systems designed for 1-D FFT can be automatically implemented to FFTs with higher dimensions.

In the by-pass form FFT implementation, there is no on-chip RAM and FFT butterfly modules are built in the data path. The by-pass form implementation is more straightforward mapped from the signal-flow or data-flow of FFT structures. Sharp LH9124/LH9320 FFT processors (DSP/Address Generator) are a typical by-pass form structure to implement the FFT signal-flow. In the following, we will the use Sharp LH9124/LH9320 FFT chip set to discuss the parallel FFT implementation to reduce the latency.

As discussed above, both 1-D and 2-D FIT can be rep-resented by the vector-matrix form. Each butterfly operation matrix can be implemented by one LH9124 instruction. In addition, each input or output permutation matrix can be implemented by one LH9320 instruction. Therefore, only a few instructions are required to run these applications based upon the proposed algorithms. Thus, system and application design time cost can be greatly reduced by the by-pass form implementation.

The LH9124 is an example of a bypass form FFT processor. It is an execution unit with four I/O ports: Q, A, B, and C. Each port has 48 bits (24-bit real bus, 24-bit imaginary bus) for transferring complex data and twiddle factor coefficients. It has a built-in radix-4 butterfly data path to implement the butterfly operation matrix BI(k) as shown in Eq. (8). There is no limitation on the size of FFT implementation as long as the right data and twiddle factor sequences are provided. In the LH9124, each butterfly operation matrix is mapped and implemented by one LH9124 instruction. For example, if the 4 k-point FFT is implemented by three radix-16 butterfly stages, only three instructions are required to compute it.

Unlike general-purpose DSPs, the 9124 does not have to consider data partitioning for large size of FFT computations using a single processor. The FFT will be computed one butterfly-stage by one butterfly-stage. From Eqs. (7) and (8), we can see that the FFT is inherently a pipelined structure. The advantage of the by-pass form FFT processors is that parallel pipelined architecture scan be easily built to enhance the input data throughput. If the ping-pong approach is used to data memories and the number of processors is equal to that of butterfly stages N, the throughput will be improved by a factor of N. For example, Catalina Research CRCV1M40/50 can have one to six cascaded LH9124 stages. For the 4 K-point FFT implemented by 3 radix-16 butterfly stages, the throughput can be enhanced by a factor of 3 with a three-deep pipelined LH9124 architecture.

The LH9320 memory management unit is an example of an address generator providing the required input and output data address sequences for the LH9124 execution unit. From Eq. (8), the permutation matrices $P_{lk}$ and $P_{rk}$ are mapped into and implemented by the instruction set of the LH9320. Each instruction will generate an address sequence and the size of the sequence can be defined by the parameter N that will be equivalent to the size of FFT.

The LH9320 provides the data sequences for mixed-radix FFT operations. Since in-place algorithms are used, the input and output data sequences will be the same and the permutation matrix $P_{lk}$ will be the transpose of $P_{lr}$. For radix-2 FFT, the algorithm for generating the data sequence of i-th stage will be for (k=0; k<$2^i$; k++)

for (j=0; k<N/2;j++)

Output {j*$2^i$+k}

For the radix-4 FFT, the algorithm for the data sequence of i-th stage will be for $(k = 0; k < 4^i; k++)$ for $\left(j = 0; k < \frac{N}{4^i}; j++\right)$ Output $\{j*4^i + k\}$ For the radix-16 FFT, the algorithm for the data sequence of i-th stage will be for $(k = 0; k < 16^i; k++)$ for $\left(j = 0; k < \frac{N}{16^i}; j++\right)$ Output $\{j*16^i + k\}$ From Eqs. (7) and (8), we can see that the FFT algorithm is very suited to be implemented by the by-pass form pipelined architecture. The output data of the current butterfly stage can be directly used as the input data for the next stage. Data throughput can be improved by pipelined or parallel architectures. However, the latency of FFT computations cannot be enhanced by pipelined structures. Parallel architecture is the only way to enhance the latency. It is not obviously shown from Eqs. (7) and (8) how to directly get a parallel structure to enhance the latency. The data is differently shuffled from stage to stage. Thus, the data scramble (address generation from each segment of the parallel architecture) has to be taken care of if the FFT is to be implemented by the parallel architecture.

In this section, we will discuss how to use the LH9320 to design a parallel architecture for FIT computations to reduce the latency. Data partitioning will be the key issue for efficient FFT parallel processing. It is derived that the butterfly computation matrix BI(k) is a block diagonal matrix. In addition, the input and output permutation matrices $P_{lk}$ and $P_{lr}$ have the structure of repeated regular patterns. Thus, if we carefully partition the data in each stage, we can get parallel computing structures. From the LH9320 instruction set, we can also partition the data address sequence into parallel data address sequences. Assume we have a parallel FFT architecture with P LH9124's where P is a power of 2. We may derive P parallel addressing sequences. For the radix-2 FFT, the parallel addressing sequences for the i-th stage can be derived from the i-th stage LH9320 radix-2 instruction BF2i as follows:

for $\left(k = 0; k < 2^{i-\log_2^P}; k++\right)$ for $(j = 0; k < N/2^i; j++)$

Parallel Outputs:

$P1: \{j*2^i + k*P\}$ $P2: \{j*2^i + (k*P+1)\}$

...

$PP: \{j*2^i + (k*P+P-1)\}$

For the radix-4 FFT, the parallel addressing sequences for the i-h stage can be derived from the i-th stage LH9320 radix-4 instruction BF4i as follows:

for $\left(k = 0; k < 4^{i-\log_4^P}; k++\right)$ for $(j = 0; k < N/4^i; j++)$

Parallel Outputs:

$P1: \{j*4^i + k*P\}$ $P2: \{j*4^i + (k*P+1)\}$

...

$PP: \{j*4^i + (k*P+P-1)\}$

For the radix-16 FFT, parallel addressing sequences for the i-th stage can be derived from the i-th stage LH9320 radix-16 instruction BF16i as follows.

for $\left(k = 0; k < 16^{i-\log_{16}^P}; k++\right)$ for $(j = 0; k < N/16^i; j++)$ Parallel Outputs:

$P1: \{j*16^i + k*P\}$ $P2: \{j*16^i + (k*P+1)\}$

...

$PP: \{j*16^i + (k*P+P-1)\}$

Similarly, we can derive parallel digit-reverse addressing sequences from the LH9320 digit-reverse sequence instruction. Assume we have a digit-reverse sequence for the FFT with M stages as $[n_1 n_2 \ldots n_{M-1} n_M]$ if $n_M$ has radix-P, we can partition the above sequence into P parallel subsequences as follows:

$P1: [n_1 n_2 \ldots n_{M-1} n_M] \times P$ $P2: [n_1 n_2 \ldots n_{M-1} n_M] \times P + 1$

...

$PP: [n_1 n_2 \ldots n_{M-1} n_M] \times P + (P-1)$

Until recently, there has been relatively little work in parallel FFT implementation, especially in by-pass form structures. The advantage of by-pass form is that it is easy to meet the strict requirements of high throughput and low latency by building parallel and pipelined system architectures.

The present invention provides a practical example of a parallel FFT implementation. Other embodiments within the scope of the invention will occur to those skilled in the art. For example, the number of data points processed, the number of parallel datapaths, and the number of processing stages, or passes through the execution units, are a matter of optimization.

What is claimed is:

1. A system for processing data in digital signal processing applications employing fast Fourier transforms (FFT's), the system processing N data points through Y processing stages using Z execution units, each execution unit having a plurality of I/O ports including A and B ports, and including an addressable memory unit for each A and B port on each execution unit, including memory units A(1) through A(Z) operatively connected to the A ports of execution units P(1) through P(Z), respectively, and including memory units B(1) through B(Z) operatively connected to the B ports of execution units P(1) through P(Z), respectively, and wherein data is processed through the Y processing stages by moving data in parallel in selectable sequences used in mixed radix FFT operations through each execution unit P(q) between memory units A(q) and B(q), and in which at the start of the processing of the data the N data points are distributed between memory units connected to one of the ports of the execution units, either A(1) through A(Z) if distributed to the memory units connected to the A ports of the execution units or B(1) through B(Z) if distributed to the memory units connected to the B ports of the execution units, each memory unit receiving N/Z data points, and each execution unit P(1) through P(Z) processing a block of N/Z data points through the Y processing stages, the processing occurring in parallel, the system for processing data comprising:

a first address generator AG-A operatively connected to memory units A(1) through A(Z) for supplying a series of selected address sequences used in mixed-radix FFT operations, the series of selected address sequences being supplied for Y processing stages to memory units A(1) through A(Z);

a second address generator AG-B operatively connected to memory units B(1) through B(Z) for supplying a series of selected address sequences used in mixed-radix FFT operations, the series of selected address sequences being supplied for Y processing stages to-memory units B(1) through B(Z); and for each of the Y processing stages, address generator AG-A supplies the same address sequence to all A(1) through A(Z) memory units, and address generator AG-B supplies the same address sequence to all B(1) through B(Z) memory units, whereby the N data points are processed in Z parallel streams through the Z execution units.

2. A system for processing data as in claim 1 including addressable memory units A(1) through A(Z) and B(1) through B(Z) which are each a single-port memory.

3. In digital signal processing applications employing fast Fourier transforms (FFT's) for processing N data points through Y processing stages using 4 execution units P(1) through P(4), each execution unit having a plurality of I/O ports including A and B ports, and including an addressable memory unit for each A and B port on each execution unit, including memory units A(1) through A(4) operatively connected to the A ports of execution units P(1) through P(4), respectively, and including memory units B(1) through B(4) operatively connected to the B ports of execution units P(1) through P(4), respectively, and wherein data is processed through the Y processing stages by moving data in parallel in selectable sequences used in mixed radix FFT operations through each execution unit P(q) between memory units A(q) and B(q), and in which at the start of the processing of the data the N data points are distributed between memory units connected to one of the ports of the execution units, either A(1) through A(4) if distributed to the memory units connected to the A ports of the execution units or B(1) through B(4) if distributed to the memory units connected to the B ports of the execution units, each memory unit receiving N/4 data points, and each execution unit P(1) through P(4) processing a block of N/4 data points through the Y processing stages, the processing occurring in parallel, the system for processing data comprising:

a first address generator AG-A operatively connected to memory units A(1) through A(4) for supplying a series of selected address sequences used in mixed-radix FFT operations, the series of selected address sequences being supplied for Y processing stages to memory units A(1) through A(4);

a second address generator AG-B operatively connected to memory units B(1) through B(4) for supplying a series of selected address sequences used in mixed-radix FFT operations, the series of selected address sequences being supplied for Y processing stages to memory units B(1) through B(4); and for each of the Y processing stages, address generator AG-A supplies the same address sequence to all A(1) through A(4) memory units, and address generator AG-B supplies the same address sequence to all B(1) through B(4) memory units, whereby the N data points are processed in 4 parallel streams through the 4 execution units.

4. In digital signal processing applications employing fast Fourier transforms (FFT's) for processing 1024 data points through Y processing stages using 4 execution units P(1) through P(4), each execution unit having a plurality of I/O ports including A and B ports, and including an addressable memory unit for each A and B port on each execution unit, including memory units A(1) through A(4) operatively connected to the A ports of execution units P(1) through P(4), respectively, and including memory units B(1) through B(4) operatively connected to the B ports of execution units P(1) through P(4), respectively, and wherein data is processed through the Y processing stages by moving data in parallel in selectable sequences used in mixed radix FFT operations through each execution unit P(q) between memory units A(q) and B(q), and in which at the start of the processing of the data the 1024 data points are distributed between memory units connected to one of the ports of the execution units, either A(1) through A(4) if distributed to the memory units connected to the A ports of the execution units or B(1) through B(4) if distributed to the memory units connected to the B ports of the execution units, each memory unit receiving 256 data points, and each execution unit P(1) through P(4) processing a block of 256 data points through the Y processing stages, the processing occurring in parallel, the system for processing data comprising:

a first address generator AG-A operatively connected to memory units A(1) through A(4) for supplying a series of selected address sequences used in mixed-radix FFT operations, the series of selected address sequences being supplied for Y processing stages to memory units A(1) through A(4);

a second address generator AG-B operatively connected to memory units B(1) through B(4) for supplying a series of selected address sequences used in mixed-radix FFT operations, the series of selected address sequences being supplied for Y processing stages to memory units B(1) through B(4); and for each of the Y processing stages, address generator AG-A supplies the same address sequence to all A(1)

through A(4) memory units, and address generator AG-B supplies the same address sequence to all B(1) through B(4) memory units, whereby the 1024 data points are processed in 4 parallel streams of 256 data points each through the 4 execution units.

5. A system for processing data as in claim 4 including addressable memory units A(1) through A(4) and B(1) through B(4) which are each a single-port memory.

* * * * *